United States Patent
Kou et al.

(10) Patent No.: US 9,634,540 B2
(45) Date of Patent: Apr. 25, 2017

(54) MAGNETIC SUSPENSION PLANAR MOTOR WITH STRUCTURE OF SUPERCONDUCTOR EXCITATION

(75) Inventors: Baoquan Kou, Harbin (CN); Xiaokun Li, Harbin (CN); Lu Zhang, Harbin (CN); He Zhang, Harbin (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 569 days.

(21) Appl. No.: 14/116,109

(22) PCT Filed: Jul. 3, 2012

(86) PCT No.: PCT/CN2012/078081
§ 371 (c)(1),
(2), (4) Date: Nov. 6, 2013

(87) PCT Pub. No.: WO2013/107160
PCT Pub. Date: Jul. 25, 2013

(65) Prior Publication Data
US 2014/0327327 A1  Nov. 6, 2014

(30) Foreign Application Priority Data
Jan. 21, 2012  (CN) .......................... 2012 1 0019414

(51) Int. Cl.
*H02K 41/02* (2006.01)
*H02K 7/09* (2006.01)
(Continued)

(52) U.S. Cl.
CPC ................. *H02K 7/09* (2013.01); *H01F 6/04* (2013.01); *H02K 41/031* (2013.01); *H02K 55/00* (2013.01); *H02K 2201/18* (2013.01)

(58) Field of Classification Search
CPC ............................... H02K 41/02; H02K 57/00
(Continued)

(56) References Cited

U.S. PATENT DOCUMENTS

| 5,015,622 | A | * | 5/1991 | Ward | ...................... | H02K 41/03 |
| | | | | | | 310/12.21 |
| 5,237,298 | A | * | 8/1993 | Boom | ....................... | H01F 6/00 |
| | | | | | | 335/216 |

(Continued)

FOREIGN PATENT DOCUMENTS

| CN | 101752983 A | * | 6/2010 | | |
| DE | DE 4008912 A1 | * | 10/1990 | ............. | H02K 29/08 |
| JP | 04354107 A | * | 12/1992 | | |

*Primary Examiner* — Jose Gonzalez Quinones (57) ABSTRACT

A magnetic suspension planar motor comprises a structure of superconductor excitation. A primary base plate is in a shape of board. Armature windings are fixed on an air gap side of the primary base plate. A secondary base plate in a secondary structure is evenly divided into 2 h*2 h magnet cells. 2 h² superconducting magnets are respectively fixed in the magnet cells on the secondary base plate, which resembles a checkerboard pattern. The superconducting magnets are adjacent to each other, neither in a horizontal direction nor in a vertical direction. The superconducting magnets are magnetized parallelly, and magnetization directions of the superconducting magnets are perpendicular to a surface on an air gap side of the secondary base plate. The superconducting magnets in a same row or column have same magnetization directions, and the superconducting magnets in adjacent rows columns have contrary magnetization directions. A cooling container shields all of the superconducting magnets.

5 Claims, 5 Drawing Sheets

(51) Int. Cl.
*H02K 41/03* (2006.01)
*H02K 55/00* (2006.01)
*H01F 6/04* (2006.01)

(58) Field of Classification Search
USPC ......... 310/12.01, 12.02, 12.05, 12.07, 12.13, 310/12.21, 12.24, 12.27, 12.06, 12.31, 310/12.32
See application file for complete search history.

(56) References Cited

U.S. PATENT DOCUMENTS

| | | | |
|---|---|---|---|
| 2005/0077786 A1* | 4/2005 | De Weerdt | H02K 41/03 310/12.07 |
| 2006/0049699 A1* | 3/2006 | Wang | H02K 41/03 310/12.18 |
| 2010/0248968 A1* | 9/2010 | Stautner | G01R 33/3804 505/162 |

* cited by examiner

MAGNETIC SUSPENSION PLANAR MOTOR WITH STRUCTURE OF SUPERCONDUCTOR EXCITATION

CROSS REFERENCE OF RELATED APPLICATION

This is a U.S. National Stage under 35 U.S.C 371 of the International Application PCT/CN2012/078081, filed Jul. 3, 2012, which claims priority under 35 U.S.C. 119(a-d) to CN201210019414.X filed Jan. 21, 2012.

BACKGROUND OF THE PRESENT INVENTION

Field of Invention

The present invention relates to a magnetic suspension planar motor, and belongs to a field of electrical machine.

Description of Related Arts

Modern precision machining equipments and ultra-precision machining equipments urgently require planar driving devices having high response, high speed, and high precision, in machining, producing electronic products, mechanical handling, manufacturing instruments and meters for automation, even driving robots, etc. Usually the planar driving device is driven by rotating motors. Rotating motion is transferred to rectilinear motion by mechanical devices, such as belts and ball screw shafts. The mechanical device is complicated, and transmission accuracy and transmission speed are limited. In addition, the mechanical device is required to be adjusted frequently in process of using, which causes disadvantages of high cost, poor reliability, and big size.

Original planar driving device is directly driven by two linear motors. This kind of planar driving device has a stacked driving structure, which increases complexity of transmission system. The mode that low dimensional motion mechanisms are superposed to form a high dimensional motion mechanism is not changed essentially. The linear motor in the bottom layer carries total mass of the linear motor in the upper layer and other relevant mechanical components, so the precision of positioning and controlling is affected seriously. However, planar motion of the planar motor is directly generated by electromagnetic energy, so the planar motor has characteristic of high output density, low heat consumption, high speed, high accuracy, and high reliability. The middle conversion devices are omitted, which transfers rotating motion to rectilinear motion, and then to planar motion, so the controlled object can be integrated with the planar motor. The planar motor has advantages of quick response, high sensitivity, good servo ability, and simple structure.

According to the generating principle of the electromagnetic thrust of the planar motors, the planar motors can be divided into variable reluctance types, synchronous type, and inductive type, wherein the synchronous planar motor has good overall performance of simple structure, big thrust, high efficiency, quick response speed, etc, so the synchronous planar motor is widely applied in two-dimensional planar driving devices, especially in precise two-dimensional planar driving devices.

Figure 7:
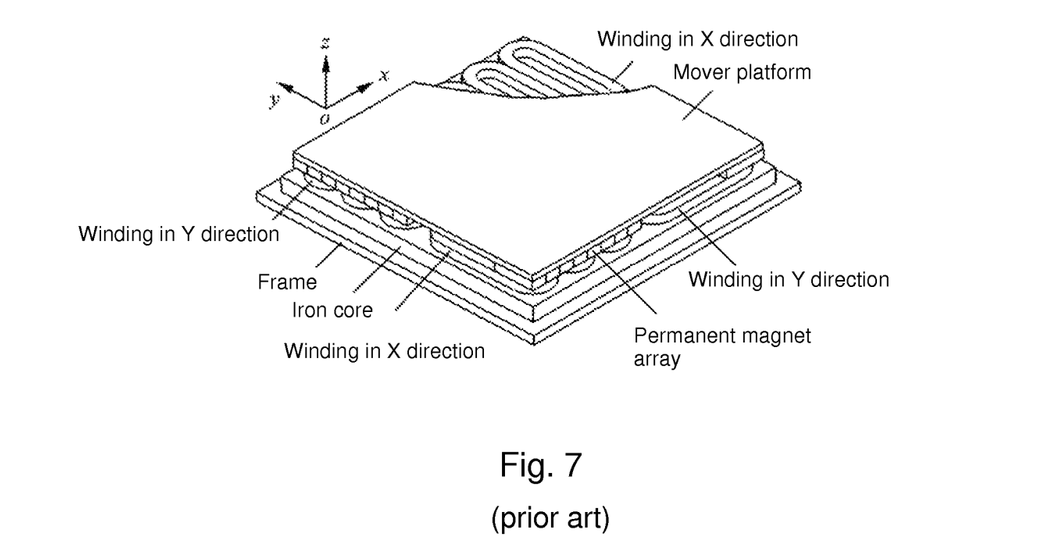
FIG. 7 is a structure view of a conventional permanent magnet synchronous planar motor.
Figure 8:
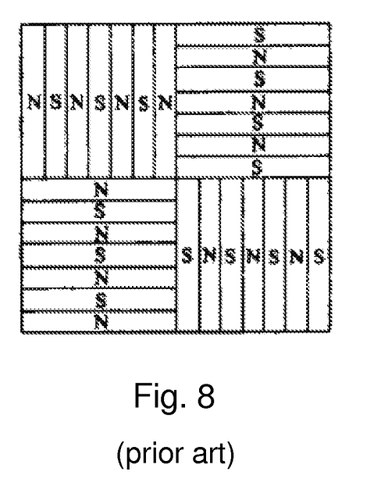
FIG. 8 is a structure view of the conventional permanent magnet synchronous planar motor.

FIGS. 7~8 show a structure of a conventional permanent magnet synchronous planar motor. The permanent magnet synchronous planar motor mainly comprises two parts, i.e., a stator and a mover. The working principle of the permanent magnet synchronous planar motor is similar to the working principle of three-phase rotating permanent magnet synchronous motor. The stator comprises an iron core, and four thrust windings provided perpendicularly to each other. Each of the thrust windings has three independent phrases. The thrust winding in the X direction is for driving the mover to move along the X direction. The thrust winding in the Y direction is for driving the mover to move along the Y direction. The mover comprises a mover platform, and four permanent magnet arrays. The permanent magnet arrays are arranged on the lower surface of the mover platform. The mover platform is able to realize positioning motions on the plane by controlling the corresponding current of the three-phase winding.

However, the permanent magnet synchronous planar motor has disadvantages of complicated motor structure, small range of planar motion, low using rate of windings, low thrust density, low system efficiency, etc.

SUMMARY OF THE PRESENT

Technical Problems

To solve problems of complicated structure, small range of planar motion, low using rate of windings, low thrust density, low system efficiency, etc. of conventional permanent magnet synchronous planar motors, the present invention provides a magnetic suspension planar motor with a structure of superconductor excitation.

Solutions of the Technical Problems

A magnetic suspension planar motor with a structure of superconductor excitation comprises: a primary structure, and a secondary structure; wherein an air gap is provided between the primary structure and the secondary structure; the primary structure comprises a primary base plate and armature windings; the primary base plate is in a shape of board; the armature windings are fixed on an air gap side of the primary base plate, wherein the air gap side is defined as a side adjacent to the air gap; the secondary structure comprises: a cooling container, and $2 h^2$ superconducting magnets, and a secondary base plate; the secondary base plate is evenly divided into $2 h*2 h$ magnet cells, wherein h is a natural number; side lengths of the magnet cells are equal to a polar distance $\tau_p$ of a magnet array; the $2 h^2$ superconducting magnets are respectively fixed in the magnet cells on the secondary base plate; the superconducting magnets are not adjacent to each other, neither in a horizontal direction nor in a vertical direction; the superconducting magnets are magnetized parallelly, magnetization directions of the superconducting magnets are perpendicular to a surface on an air gap side of the secondary base plate; the superconducting magnets in a same row or a same column have same magnetization directions; the superconducting magnets in adjacent rows or adjacent columns have contrary magnetization directions; and the cooling container shields all of the superconducting magnets. In the present invention, the superconducting magnets are embodied as superconductors, wherein the superconductor is in a shape of disc, annulus or frustum of a cone. In the present invention, the superconducting magnets are embodied as superconducting coils, wherein the superconducting coil is in a shape of annulus. In the present invention, each of the superconducting coils twines around a core made of high-permeability materials, and the cores are fixedly connected with the secondary base plate. In the present invention, the primary base plate is made of nonmagnetic materials. In the present invention, the primary base plate comprises an electromagnetic shielding plate on an upper side thereof, wherein the upper side refers to a side opposite to the air gap side. In the present invention, the primary structure comprises a liquid cooling structure, wherein cooling liquid pipelines are arranged on the primary base plate. In the present invention, the primary structure further comprises a deflection controlling winding; wherein the deflection controlling winding comprises a deflection controlling winding in an X direction and a deflection controlling winding in a Y direction; the deflection controlling winding in the X direction comprises 2 m coils, which are evenly divided into two groups; the two groups of the coils are fixed on the primary base plate, and are arranged at two sides of the armature windings symmetrically in the X direction; the deflection controlling winding in the Y direction 3 comprises 2 m coils, which are evenly divided into two groups; the two groups of the coils are fixed on the primary base plate, and are arranged at two sides of the armature windings symmetrically in the Y direction; and m is a natural number. In the present invention, the primary structure in the magnetic suspension planar motor is used as a mover.

Beneficial Effects of the Present Invention

The secondary structure of the planar motor comprises the structure of superconductor excitation, in such a manner that magnetic flux density of the air gap is increased significantly. Accordingly, the armature windings in the planar motor have coreless structures. A magnetic attraction force does not exist between the primary structure and the secondary structure, in such a manner that the primary structure is able to realize suspension motion. The planar motor has big outputting thrust, high thrust density, good dynamic characteristics, large suspension height, good carrying capacity, small thermal deformation, and high positioning accuracy, and the planar motor is able to be applied in vacuum environment.

These and other objectives, features, and advantages of the present invention will become apparent from the following detailed description, the accompanying drawings, and the appended claims.

DETAILED DESCRIPTION OF THE PREFERRED EMBODIMENT

Embodiment 1

A magnetic suspension planar motor with a structure of superconductor excitation according to the embodiment 1 comprises: a primary structure, and a secondary structure; wherein an air gap is provided between the primary structure and the secondary structure; the primary structure comprises a primary base plate and armature windings; the primary base plate is in a shape of board; the armature windings are fixed on an air gap side of the primary base plate, wherein the air gap side is defined as a side adjacent to the air gap; the secondary structure comprises a secondary base plate 1, a cooling container, and 2 $h^2$ superconducting magnets 2; the secondary base plate 1 is evenly divided into 2 h*2 h magnet cells, wherein h is a natural number; side lengths of the magnet cells are equal to a polar distance $\tau_p$ of a magnet array; the 2 $h^2$ superconducting magnets 2 are respectively fixed in the magnet cells on the secondary base plate 1; the superconducting magnets 2 are not adjacent to each other, neither in a horizontal direction nor in a vertical direction; the superconducting magnets 2 are magnetized parallelly, magnetization directions of the superconducting magnets 2 are perpendicular to a surface on an air gap side of the secondary base plate 1; the superconducting magnets 2 in a same row or a same column have same magnetization directions; the superconducting magnets 2 in adjacent rows or adjacent columns have contrary magnetization directions; and the cooling container shields all of the superconducting magnets 2.

Figure 5:
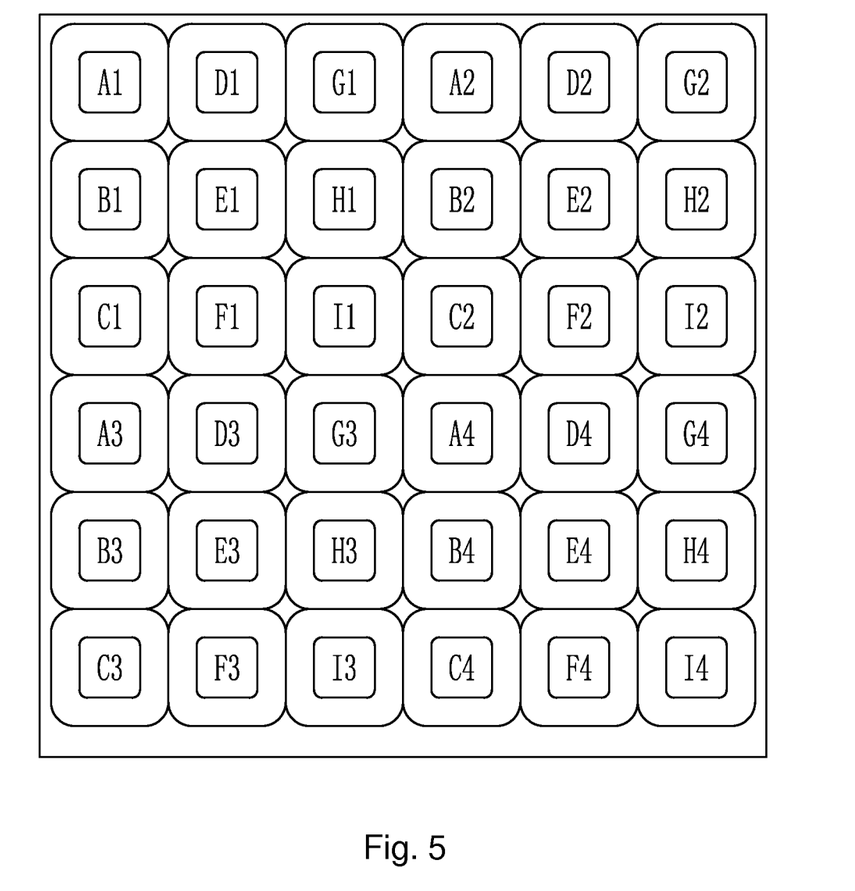
FIG. 5 is a sketch view of a primary structure according the embodiments of the present invention.

The primary base plate in the primary structure, as recited in the embodiment 1, is in a shape of board. Referring to FIG. 5, the armature winding is coreless, and a magnetic attraction force does not exist between the primary structure and the secondary structure, in such a manner that the primary structure is able to realize suspension motion.

Embodiment 2

The magnetic suspension planar motor with the structure of superconductor excitation in the embodiment 2 is different from the magnetic suspension planar motor with the structure of superconductor excitation in the embodiment 1 in that, furthermore, the superconducting magnets 2 are embodied as superconductors, wherein the superconductor is in a shape of disc or annulus.

Figure 1:
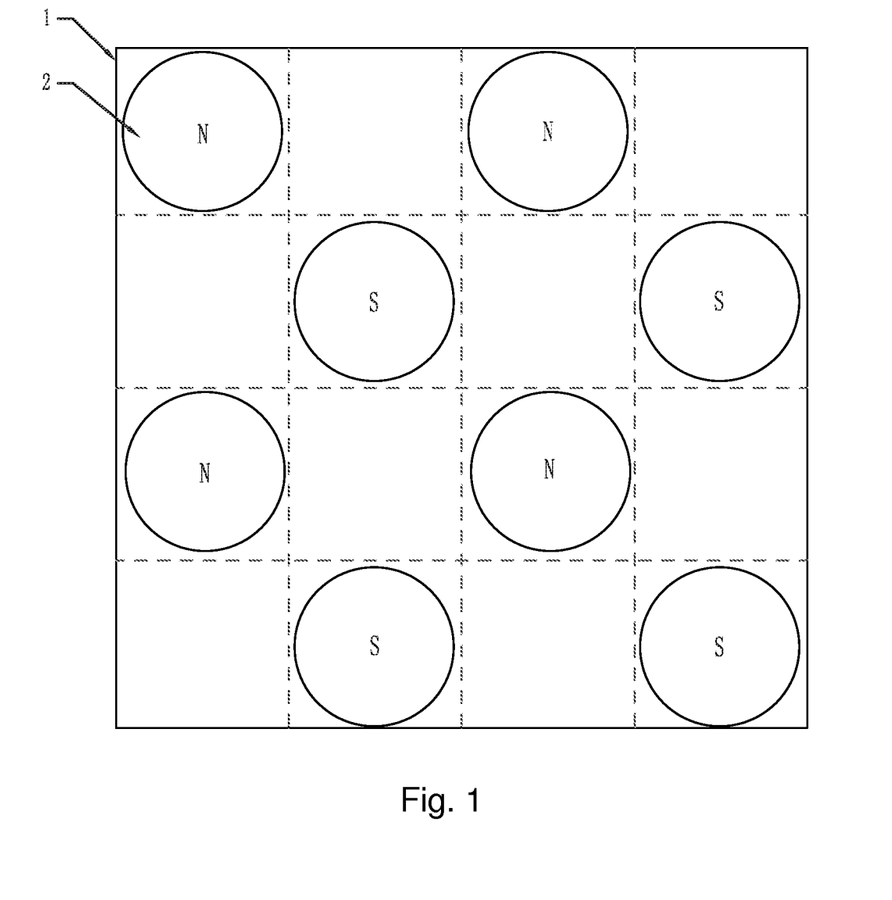
FIG. 1 is a sketch view of a secondary structure according to embodiment 2, wherein a superconductor is in a shape of disc.
Figure 2:
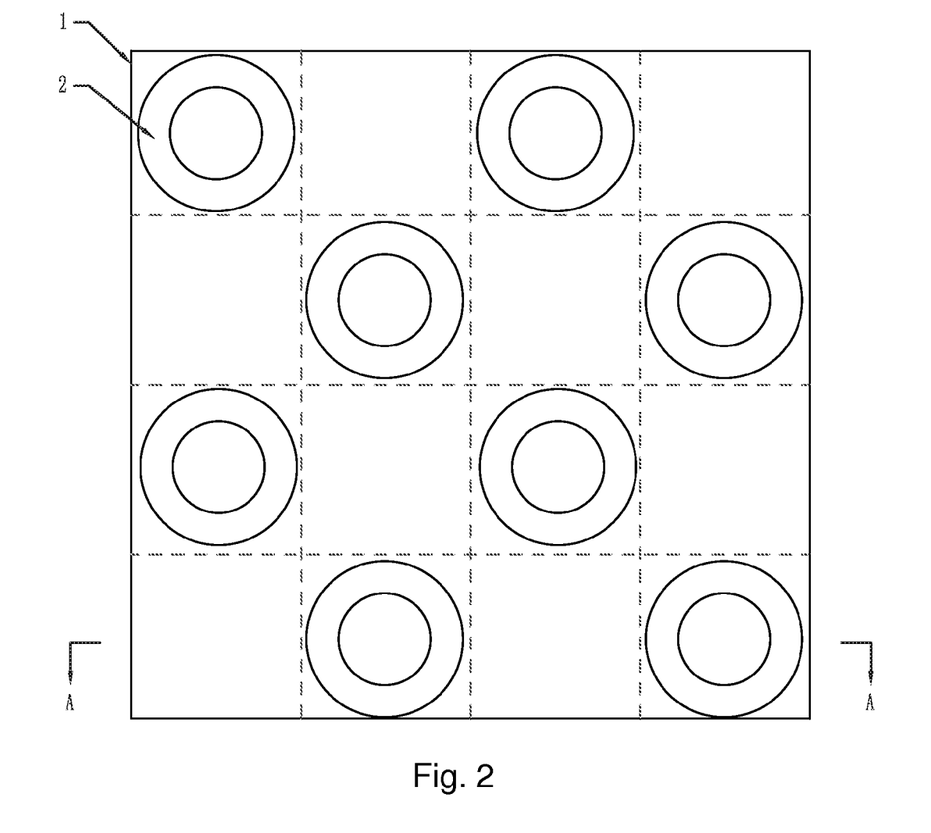
FIG. 2 is a sketch view of a secondary structure, wherein the superconductor is in a shape of annulus or frustum of a cone.
Figure 3:
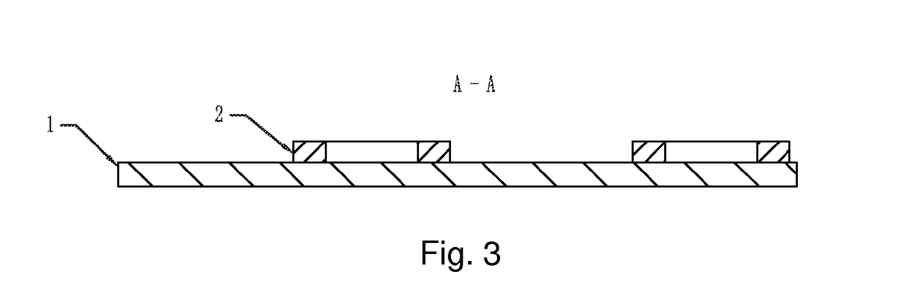
FIG. 3 is a sectional view of the FIG. 2 in a direction A-A, wherein the superconductor is in the shape of annulus.

FIG. 1 shows a structure of the magnetic suspension planar motor with the structure of superconductor excitation as recited in the embodiment 2. In the structure, h=2, so the secondary base plate is divided into 4*4 magnet cells, and eight superconducting magnets 2 are provided in the secondary structure. The eight superconducting magnets 2 are arranged as FIG. 1. FIG. 2 is a sketch view illustrating the structure of the magnetic suspension planar motor with the structure of superconductor excitation, wherein the superconductors are in the shape of annulus.

Embodiment 3

The magnetic suspension planar motor with the structure of superconductor excitation in the embodiment 3 is different from the magnetic suspension planar motor with the structure of superconductor excitation in the embodiment 1 in that, furthermore, the superconducting magnets 2 are embodied as superconductors, wherein the superconductor is in a shape of frustum of a cone, and a bottom of the frustum of the cone, which has a larger diameter, is fixedly connected with the secondary base plate.

Figure 4:
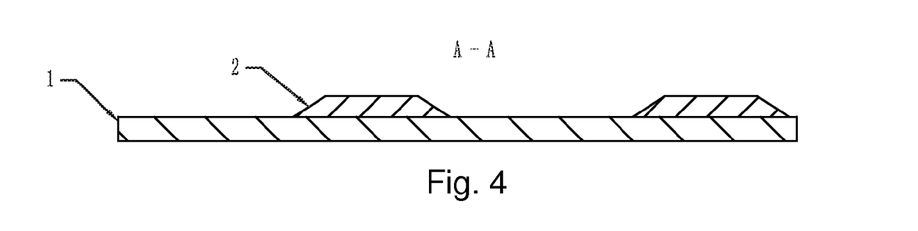
FIG. 4 is a sectional view of the FIG. 2 in the direction A-A, wherein the superconductor is in the shape of frustum of a cone.

FIG. 2 and FIG. 4 show a structure of the magnetic suspension planar motor with the structure of superconductor excitation as recited in the embodiment 3. In the structure, h=2, so the secondary base plate 1 is divided into 4*4 magnet cells, and eight superconducting magnets 2 are provided in the secondary structure. The eight superconducting magnets 2 are arranged as FIG. 1.

Embodiment 4

The magnetic suspension planar motor with the structure of superconductor excitation in the embodiment 4 is different from the magnetic suspension planar motor with the structure of superconductor excitation in the embodiment 1 in that, furthermore, the superconducting magnets 2 are embodied as superconducting coils, wherein the superconducting coil is in a shape of annulus.

Embodiment 5

The magnetic suspension planar motor with the structure of superconductor excitation in the embodiment 5 is different from the magnetic suspension planar motor with the structure of superconductor excitation in the embodiment 4 in that, furthermore, each of the superconducting coils twines around a core made of high-permeability materials, wherein the cores are fixedly connected with the secondary base plate, the cores are made of permeability materials. After adding the cores, waveform of magnetic field generated by the superconducting coils is improved, in such a manner that sine degree of the waveform is improved, and magnetic flux density of the air gap is increased efficiently.

Embodiment 6

The magnetic suspension planar motor with the structure of superconductor excitation in the embodiment 6 is different from the magnetic suspension planar motor with the structure of superconductor excitation in the embodiment 1 in that, furthermore, the primary base plate is made of nonmagnetic materials.

Embodiment 7

The magnetic suspension planar motor with the structure of superconductor excitation in the embodiment 7 is different from the magnetic suspension planar motor with the structure of superconductor excitation in the above embodiments in that, furthermore, the primary base plate comprises an electromagnetic shielding plate on an upper side thereof, wherein the upper side refers to a side opposite to the air gap side.

Embodiment 8

The magnetic suspension planar motor with the structure of superconductor excitation in the embodiment 7 is different from the magnetic suspension planar motor with the structure of superconductor excitation in the above embodiments in that, furthermore, the primary structure comprises a liquid cooling structure, wherein cooling liquid pipelines are arranged on the primary base plate.

Embodiment 9

Figure 6:
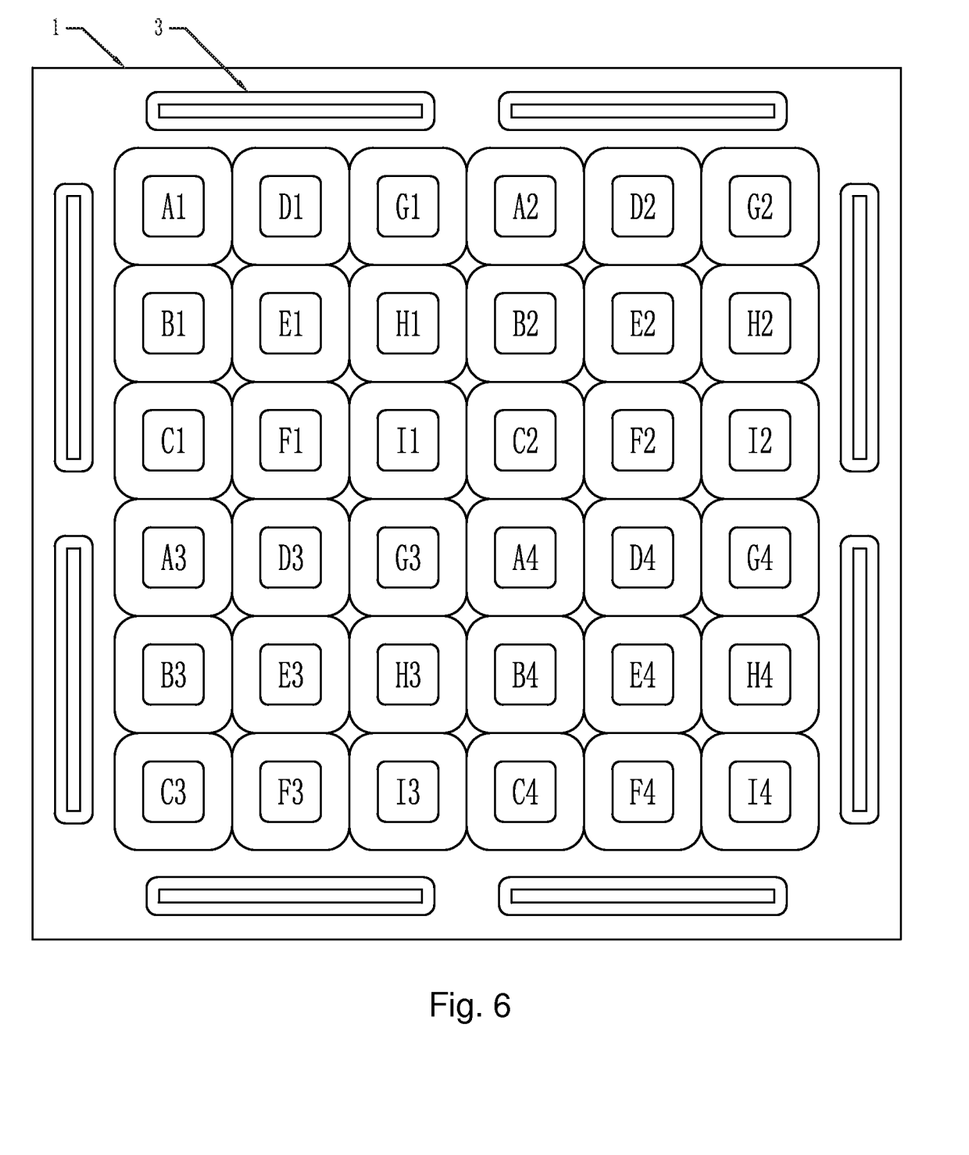
FIG. 6 is a sketch view of the primary structure of a magnetic suspension planar motor with a structure of superconductor excitation according to embodiment 9 of the present invention.

The magnetic suspension planar motor with the structure of superconductor excitation in the embodiment 9 is different from the magnetic suspension planar motor with the structure of superconductor excitation in the above embodiments in that, furthermore, the primary structure further comprises a deflection controlling winding 3; wherein the deflection controlling winding 3 comprises a deflection controlling winding in an X direction 3 and a deflection controlling winding in a Y direction 3; the deflection controlling winding in the X direction 3 comprises 2 m coils, which are evenly divided into two groups; the two groups of the coils are fixed on the primary base plate, and are arranged at two sides of the armature windings symmetrically in the X direction; the deflection controlling winding in the Y direction 3 comprises 2 m coils, which are evenly divided into two groups; the two groups of the coils are fixed on the primary base plate, and are arranged at two sides of the armature windings symmetrically in the Y direction; and m is a natural number more than 1. The primary structure as recited in the embodiment 9 is shown in FIG. 6.

Embodiment 10

The magnetic suspension planar motor with the structure of superconductor excitation in the embodiment 10 is different from the magnetic suspension planar motor with the structure of superconductor excitation in the above embodiments in that, furthermore, the primary structure in the magnetic suspension planar motor is used as a mover.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A magnetic suspension planar motor comprising: a primary structure, and a secondary structure; wherein an air gap is provided between said primary structure and said secondary structure; said primary structure comprises a primary base plate and armature windings; said primary base plate is in a shape of board; said armature windings are fixed on an air gap side of said primary base plate, wherein said air gap side is defined as a side adjacent to said air gap; said secondary structure comprises a secondary base plate (1), a cooling container, and 2 $h^2$ superconducting magnets (2); said secondary base plate (1) is evenly divided into 2 h*2 h magnet cells, wherein h is a positive number; side lengths of said magnet cells are equal to a polar distance $\tau_p$ of a magnet array; said 2 $h^2$ superconducting magnets (2) are respectively fixed in said magnet cells on said secondary base plate (1); said superconducting magnets (2) are not directly horizontally adjacent and not directly vertically adjacent to each other, neither in a horizontal direction nor in a vertical direction; said superconducting magnets (2) are magnetized parallelly, magnetization directions of said superconducting magnets (2) are perpendicular to a surface on an air gap side of said secondary base plate (1); said superconducting magnets (2) in a same row or a same column have same magnetization directions; said superconducting magnets (2) in adjacent rows or adjacent columns have contrary magnetization directions; and said cooling container shields all of said superconducting magnets (2);

wherein said primary base plate is made of nonmagnetic materials;

wherein said primary base plate comprises an electromagnetic shielding plate on an upper side thereof, wherein said upper side refers to a side opposite to said air gap side;

wherein said primary structure comprises a liquid cooling structure, and cooling liquid pipelines are arranged on said primary base plate;

wherein said primary structure further comprises a deflection controlling winding (3); said deflection controlling winding (3) comprises a deflection controlling winding in an X direction (3) and a deflection controlling winding in a Y direction (3); said deflection controlling winding in said X direction (3) comprises 2 m coils, which are evenly divided into two groups; said two groups of said coils are fixed on said primary base plate, and are arranged at two sides of said armature windings symmetrically in said X direction; said deflection controlling winding in said Y direction (3) comprises 2 m coils, which are evenly divided into two groups; said two groups of said coils are fixed on said primary base plate, and are arranged at two sides of said armature windings symmetrically in said Y direction; and m is a natural number more than 1;

wherein said primary structure in said magnetic suspension planar motor is used as a mover.

2. The magnetic suspension planar motor, as recited in claim 1, wherein said superconducting magnets (2) are superconductors, and said superconductor is in a shape of disc or annulus.

3. The magnetic suspension planar motor, as recited in claim 1, wherein said superconducting magnets (2) are superconductors; said superconductor is in a shape of frustum of a cone; and a bottom of said frustum of said cone, which has a larger diameter, is fixedly connected with said secondary base plate (1).

4. The magnetic suspension planar motor, as recited in claim 1, wherein said superconducting magnets (2) are superconducting coils, and said superconducting coil is in a shape of annulus.

5. The magnetic suspension planar motor, as recited in claim 4, wherein each of said superconducting coils twines around a core made of high-permeability materials, and said cores are fixedly connected with said secondary base plate (1).

* * * * *